Figure 1:
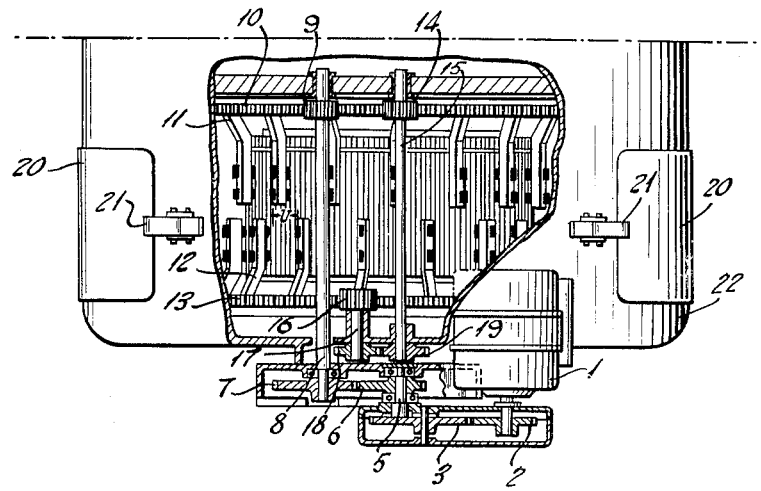

INVENTORS
GUNNAR BERGKNUT and
CARL KIESSLING
BY
ATTORNEY

Patented Dec. 1, 1953

2,661,435

UNITED STATES PATENT OFFICE 2,661,435

THREE-PHASE COMMUTATOR MOTOR WITH SPEED REGULATION BY BRUSH DISPLACEMENT

Gunnar Percy Bergknut and Carl J. E. Kiessling, Vasteras, Sweden, assignors to Allmänna Svenska Elektriska Aktiebolaget, Vasteras, Sweden, a Swedish corporation Application February 9, 1952, Serial No. 270,834

Claims priority, application Sweden February 13, 1951

3 Claims. (Cl. 310—150)

In three-phase commutator motors with shunt characteristics, the speed regulation often is performed by means of a displacement of the brushes which are then arranged on two movable brush yokes. The speed regulation is then effected by the motion of these yokes in opposite directions. The speed of the motor, however, which is a function of the position of the brushes is not a straight line but has the characteristic of a sinus curve with its steepest part coinciding with the synchronous speed, whereas the parts of the curve having a smaller inclination are to be found at the beginning and at the end of the regulating range. This means that if a pilot motor with constant speed is used for the motion of the brushes, the speed of the commutator motor at the start will change rather slowly and then more rapidly, until the synchronous speed is reached and then the speed at the further displacement of the brushes is further increased, but now more slowly until the highest speed is reached.

This involves certain disadvantages, especially in that the time for the regulation of the speed from a standstill up to full speed will be unnecessarily long, because the speed change is not allowed to exceed a certain value in order that the current rush through the motor shall not be too large. If therefore a constant displacement speed of the brush yokes is used, the maximum speed change can be utilized only within a small range around the synchronous speed of the motor, whereas on the other parts of the regulating range the speed change per time unit will be unnecessarily small.

In acceleration and retardation of large inertias, therefore, the motor cannot be utilized to the best advantage because, as mentioned above, the speed of the displacement of the brushes near the synchronous speed is not allowed to exceed a certain maximum value determined by the highest allowable current. The said disadvantage could be avoided if the speed of the brush pilot motor could be changed during the regulation, but that would involve comparatively complicated regulating devices.

The present invention concerns a device in which, in a simple manner, a changing brush displacement speed can be attained in spite of the fact that the pilot motor runs with constant speed, so that within the major part of the regulating range the regulation may be performed with a maximum speed change. The main feature of the present invention is that, between the pilot motor and the brush displacement device, a tooth gear is inserted which has one or a plurality of pairs of meshing tooth wheels, said wheels having pitch lines with a radius vector which changes in desired manner, but so that the central distance between the meshing wheels remains constant. By a suitable choice of pitch lines for these wheels it is possible to attain a linear speed regulation of the commutator motor over the whole regulating range while using a pilot motor having a constant speed.

Figure 2:
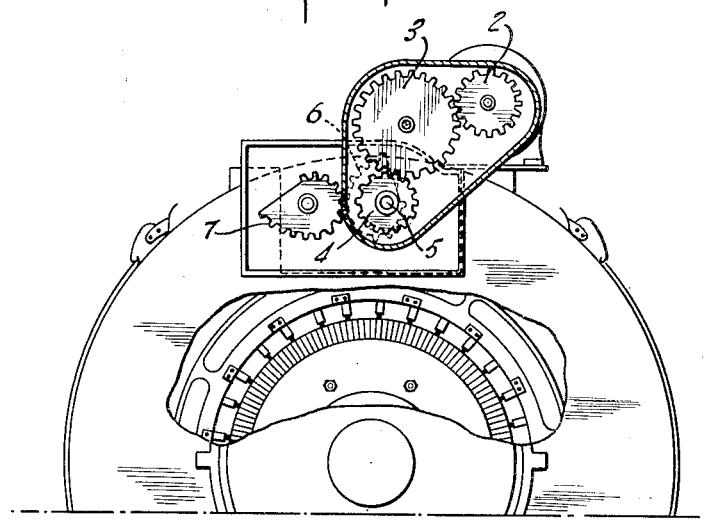
Figure 3:
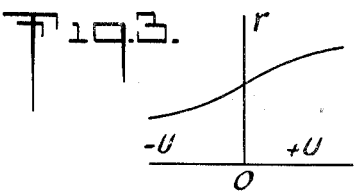

The device according to the invention will be more clearly understood from the accompanying drawing in which Fig. 1 shows the commutator of the motor with the brush yokes and the gears between the pilot motor and the brush yokes, and Fig. 2 shows the commutator of the motor with brushes and the brush yokes in a view parallel with the main shaft of the commutator motor. Fig. 3 shows the speed of the commutator motor as a function of the angle between the brush sets.

On the drawing 1 designates the pilot motor which is attached to one of the end shields 22 of the commutator motor. 20 designates covers attached to the end shield by means of locks or clamps 21.

The motor 1 rotates with a constant speed and moves the brush yokes 11 and 12 in opposite directions by means of the tooth-wheels and shafts shown on the drawing. Among these tooth-wheels two spiral wheels 6, 7 form a gear with a continuously changing ratio, so that the yokes will move with a changing speed. When the brushes coincide the motor will run with its synchronous speed. When the angle between the brushes (angle $u$ in Fig. 3) is increased in one direction, the speed of the commutator motor is decreased, and when the angle is increased in the other direction the speed of the motor is decreased.

The pilot motor 1 drives the shaft 5 through the medium of the circular tooth-wheels 2, 3 and 4. Between the shafts 5 and 8 the above mentioned spiral formed tooth-wheels 6, 7 are inserted. The tooth-wheel 7 on the shaft 8 will move the brush yoke 11 by means of the pinion 9 and tooth-ring 10. From the tooth-ring 10 the shaft 15 is driven in the same direction as the shaft 8 by means of the pinion 14 which has the same number of teeth as the pinion 9. From the shaft 15 the shaft 17 is driven by means of the circular tooth-wheel 18 and 19 which have the same number of teeth. The shaft 17 will thus be turned in a direction opposite to that of the shaft 8. The pinion 16 has the same number of teeth and the same diameter as the pinions 9 and 14 and is attached on the shaft 17 from which the brush yoke 12 is driven by means of the tooth-ring 13 which has the same number of teeth and the same diameter as the tooth-ring 10. The brush yokes 11, 12 will thus move through the same angle but in opposite directions.

We claim as our invention:

1. A speed regulating device for three-phase commutator motors having a constant speed pilot motor for displacing the brushes, comprising yokes for the brushes, gear means operated by said pilot motor and including a pair of spiral gear wheels so meshing with each other that in all relative positions of said wheels the distance between their centers remains constant, and means whereby said gear means imparts to said yokes constantly varying displacement in opposite directions.

2. A speed regulating device for three-phase commutator motors having a constant speed pilot motor for displacing the brushes, comprising two yokes carrying the brushes, gear means operated by the pilot motor and including a pair of spiral gear wheels having a radii of such dimensions that when one of the spiral wheels is driven at constant angular speed the current through the commutator motor is practically constant within the entire regulating range, and means whereby said spiral wheels impart to both said brush yokes constantly varying displacement in opposite directions.

3. A speed regulating device for three-phase commutator motors having a constant speed pilot motor for displacing the brushes, comprising two brush yokes, gear means operated by said pilot motor and including a pair of spiral gear wheels so meshing with each other that in all relative angular positions of said wheels the distance between their centers remains constant, means whereby said gear means displaces one of said yokes, and gear mechanism whereby the movement of said yoke is transmitted to the second yoke so that displacements similar to each other but in opposite directions are imparted to the yokes.

GUNNAR PERCY BERGKNUT.
CARL J. E. KIESSLING.

References Cited in the file of this patent

UNITED STATES PATENTS

| Number | Name | Date |
|---|---|---|
| 1,376,020 | Korthals-Altes | Apr. 26, 1921 |
| 1,590,030 | Hull | June 22, 1926 |
| 1,734,907 | Hull | Nov. 5, 1929 |
| 1,818,803 | Hull | Aug. 11, 1931 |

FOREIGN PATENTS

| Number | Country | Date |
|---|---|---|
| 492,105 | Great Britain | Sept. 12, 1938 |